W. T. ADAMS.
COTTON GIN FEEDERS AND PICKERS.

No. 184,055. Patented Nov. 7, 1876.

WITNESSES:

INVENTOR:
W. T. Adams
BY
ATTORNEYS.

UNITED STATES PATENT OFFICE.

WILLIAM T. ADAMS, OF RIENZI, MISSISSIPPI.

IMPROVEMENT IN COTTON-GIN FEEDERS AND PICKERS.

Specification forming part of Letters Patent No. 184,055, dated November 7, 1876; application filed September 9, 1876.

*To all whom it may concern:*

Figure 1:
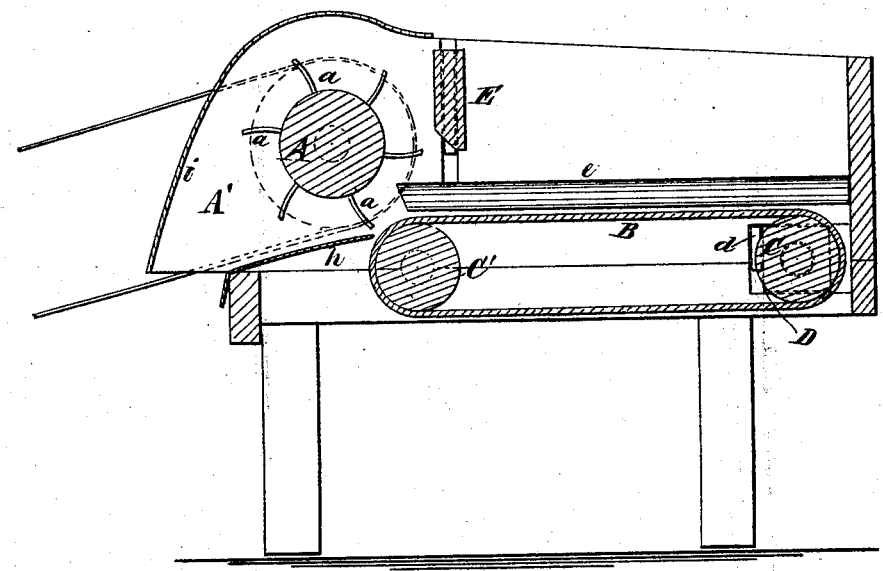
Figure 2:
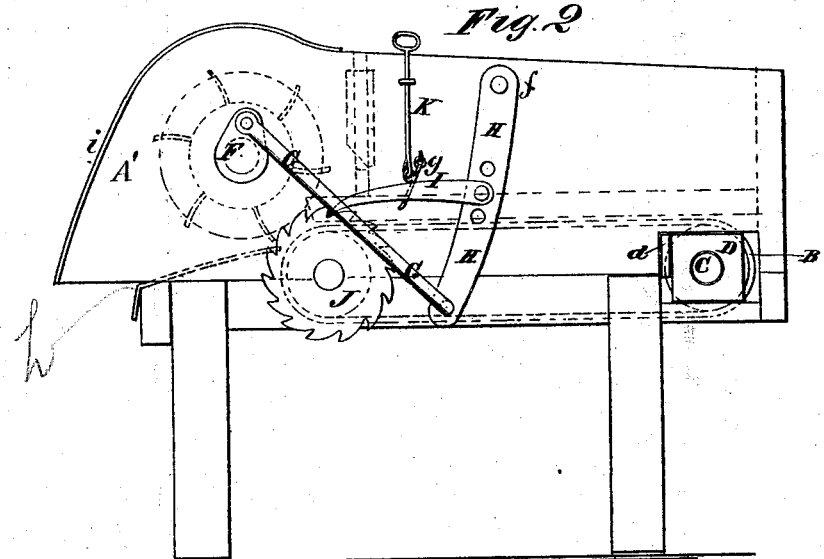
Figure 3:
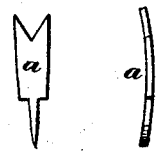

Be it known that I, WILLIAM T. ADAMS, of Rienzi, county of Alcorn and State of Mississippi, have invented a new and Improved Cotton-Gin Feed and Picker, of which the following is a specification:

In the accompanying drawing, Figure 1 is a vertical longitudinal section. Fig. 2 is a side elevation; and Fig. 3 is a detail view of the picker-teeth.

Similar letters of reference indicate corresponding parts.

My invention consists in a picker-cylinder, having forked and curved teeth.

In the drawing, A is the picker-cylinder, supported by a suitable shaft having journal-boxes in the side pieces A'. $a\, a$ are picker-teeth, (shown in Fig. 3,) which are cut from plates of steel or iron, having a tang for driving into the cylinder, and forked or provided with a notch at their outer ends. They are curved slightly, with their convex surfaces facing the direction of the rotation of the cylinder. B is an endless apron of strong duck or other suitable material, which is supported upon the rollers C' C between the sides A' of the machine. The journal-box D of the roller C slides in the frame for the purpose of tightening the apron B, and it is held in place by the wedge $d$. E is a bar placed across the machine, forming a throat, through which the apron B carries the cotton to the cylinder A. Bevel-pieces $e$ are attached to the sides of the machine just above the apron, to prevent cotton from getting between the edges of the apron and the sides of the machine.

F is a crank attached to the end of the picker-cylinder shaft, and connected by the rod G to the lever H, which is pivoted at $f$. I is a pawl provided with a pin, which may be placed in one of a series of holes in the lever H. A ratchet-wheel, J, is placed on the shaft of the roller C', and is moved by the pawl I. K is a rod connected with a lever, $g$, which is capable of raising the pawl I from the wheel J. A plate, $h$, carries the cotton from the apron B. A hood, $i$, covers the picker-cylinder, and prevents the cotton from flying out of the machine.

Cotton to be operated upon is placed on the apron B, when it is carried forward to the picker, the apron being moved by the crank F, by means of the rod C, lever H, pawl I, and ratchet-wheel J. The picker, being revolved by a belt from the gin, acts upon the cotton as it comes over the roller C' and delivers it to the gin through the space between the plate $h$ and hood $i$. The rapidity with which the cotton is fed into the machine is varied by connecting the pawl I with different holes in the lever H.

Having thus described my invention, I claim as new and desire to secure by Letters Patent—

The combination, with cylinder A, of the cotton picker-teeth $a$, forked, curved, and provided with tangs, substantially as and for the purpose specified.

WILLIAM T. ADAMS.

Witnesses:
   R. F. ARNOLD,
   M. L. FITZGERALD.